US005264271A

United States Patent [19]

Satake et al.

[11] Patent Number: 5,264,271

[45] Date of Patent: Nov. 23, 1993

[54] ELECTROTHERMAL TRANSFER SHEET

[75] Inventors: Naoto Satake; Tatsuya Kita, both of Tokyo, Japan

[73] Assignee: Dai Nippon Printing Co., Ltd., Japan

[21] Appl. No.: 840,914

[22] Filed: Feb. 25, 1992

[30] Foreign Application Priority Data

Feb. 27, 1991 [JP] Japan .................................. 3-53697

[51] Int. Cl.[5] ............................................... B32B 5/16

[52] U.S. Cl. .................................. 428/195; 428/207; 428/337; 428/447; 428/457; 428/484; 428/913; 503/227

[58] Field of Search ............... 428/913, 195, 216, 335, 428/207, 337, 447, 457, 484, 913; 503/227

[56] References Cited

U.S. PATENT DOCUMENTS 4,684,563 8/1987 Hayashi et al. ..................... 428/207
4,913,975 4/1990 Taniguchi ........................... 428/480
4,963,522 10/1990 Egashira et al. ................... 503/227
5,187,002 4/1993 Egashira et al. ................... 428/195

FOREIGN PATENT DOCUMENTS 63-249689 10/1988 Japan .
1-90793 4/1989 Japan .
2-34394 2/1990 Japan .
2-45190 2/1990 Japan .
2-188292 7/1990 Japan .
2-283495 11/1990 Japan .

*Primary Examiner*—Patrick J. Ryan
*Assistant Examiner*—W. Krynski
*Attorney, Agent, or Firm*—Parkhurst, Wendel & Rossi

[57] ABSTRACT

An electrothermal transfer sheet whose resistor layer is free from heat shrinkage and is excellent in flexibility and adhesion to a substrate sheet can be produced with high productivity. The transfer sheet includes a substrate sheet, a heat-transferable dye layer formed on one surface of the substrate sheet, and a resistor layer capable of generating heat when an electric current is applied thereto from an electrode head, formed on the other surface of the substrate sheet. The resistor layer includes (a) a binder resin, (b) an electrically conductive filler and (c) a crosslinking agent which includes a mixture of a thermosetting crosslinking agent and an ionizing-radiation-curable crosslinking agent.

5 Claims, No Drawings

ELECTROTHERMAL TRANSFER SHEET

BACKGROUND OF THE INVENTION

The present invention relates to an electrothermal transfer sheet, and more particularly to a thermal transfer sheet for use in an electrothermal transfer printing system.

The electrothermal transfer method is a method in which an electric current is applied to a transfer sheet from an electrode head to generate heat, and transfer recording of an image is effected by utilizing this heat. In this method, an electrothermal transfer sheet composed of a substrate sheet, a resistor layer capable of generating heat when an electric current is applied thereto from an electrode head, formed on one surface of the substrate sheet, and a dye layer which is a sublimable dye layer or a wax ink layer dyed with a pigment, formed on the other surface of the substrate sheet has been conventionally used as the transfer sheet.

In the electrothermal transfer method, as described above, thermal energy is generated by applying an electric current to the resistor layer of the electrothermal transfer sheet from an electrode head, and the thus generated heat is utilized for transfer recording of an image. Concentration of heat is therefore readily caused in the electrothermal transfer sheet, and the resistor layer partially has an extremely high temperature. As a result, the resistor layer is fused or softened, and the electrothermal transfer sheet and the electrode head are adhered to each other, or scrapings of the resistor layer deposit on the electrode head, causing a short circuit, whereby the electrothermal transfer sheet is broken. Thus, the conventional electrothermal transfer sheet has the problems concerning resistance to heat.

To improve the heat resistance of the resistor layer which is provided on the substrate sheet, one of the following conventional methods has been adopted:

(a) a method in which a resistor layer is prepared using a resin having high resistance to heat;

(b) a method in which a resistor layer is hardened by application of heat, using a crosslinking agent such as polyisocyanate, thereby imparting heat resistance to the resistor layer; and (c) a method in which a reactive monomer is incorporated into a resistor layer and crosslinked by application of an ionizing radiation, or a resistor layer is prepared using an ionizing-radiation-curable resin, thereby imparting heat resistance to the resistor layer.

The above methods (b) and (c) are disclosed in Japanese Laid-Open Patent Publication No. 283495/1990. With respect to the method (a), resins having high resistance to heat are generally expensive. In addition, they cannot be readily dissolved in commercially available widely-used solvents, so that films cannot be easily formed when such resins are employed. When aromatic polyisocyanate is used in the method (b), the resistor layer is hardened rapidly, so that it tends to shrink. Such a shrinkage is unfavorable because the thermal transfer sheet acquires wrinkles. In the case where aliphatic polyisocyanate is used, the resistor layer is hardened slowly (3 to 7 days at 40° C.). This affects the process which comes after this hardening process, and also increases the production cost. Further, in this case, it is required to make the crosslinking agent a two-part system, so that the resistance value of the resistor layer becomes large. The resistor layer formed in the method (c), crosslinked by an ionizing radiation, exhibits reduced adhesion to the substrate sheet. Moreover, an adhesive resin which can improve the adhesion between such a resistor layer and the substrate sheet is very few and limited.

SUMMARY OF THE INVENTION

Accordingly, an object of the present invention is to provide with high productivity an electrothermal transfer sheet comprising a resistor layer which is free from heat shrinkage and is excellent in adhesion to a substrate sheet.

The above object can be attained by an electrothermal transfer sheet comprising a substrate sheet, a heat-transferable dye layer formed on one surface of the substrate sheet, and a resistor layer capable of generating heat when an electric current is applied thereto from an electrode head, formed on the other surface of the substrate sheet, comprising (a) a binder resin, (b) an electrically conductive filler, and (c) a crosslinking agent which comprises a mixture of a thermosetting crosslinking agent and an ionizing-radiation-curable crosslinking agent.

Since both polyisocyanate and a reactive monomer are used as crosslinking agents for a resistor layer, an electrothermal transfer sheet whose resistor layer shrinks less when heat is applied thereto and is superior in adhesion to a substrate sheet, heat resistance and the resistance value than a resistor layer crosslinked with the polyisocyanate or the reactive monomer can be produced with high productivity.

BEST MODES FOR CARRYING OUT THE INVENTION

The present invention will now be explained in detail referring to preferred embodiments.

Any conventionally-known material having both heat resistance and mechanical strength in some degree can be employed as the substrate sheet of the electrothermal transfer sheet of the present invention. For instance, ordinary paper, coated paper of various kinds, a polyester film, a polystyrene film, a polypropylene film, a polyether sulfone film, an aramide film, a polycarbonate film, a polyvinyl alcohol film and a cellophane film are employable. Of these, a polyester film, in particular, a polyethylene terephthalate film is preferred. The thickness of the substrate sheet is approximately from 0.5 to 50 μm, preferably from 3 to 10 μm. The above-enumerated films can be used either in sheet form or as a continuous film. It is also preferable to provide an adhesive layer or layers on one or both surfaces of the film, if necessary.

The dye layer formed on one surface of the substrate sheet is a dye layer comprising a sublimable dye, or a wax ink layer dyed with a pigment. The former dye layer is for a sublimation-type thermal transfer sheet, and the latter one is for a heat-fusion-type thermal transfer sheet. An explanation of the dye layer for a sublimation-type thermal transfer sheet will be given hereafter as a representative example. However, the present invention is not limited to the sublimation-type thermal transfer sheet.

Any dye which has been used for preparing a conventional electrothermal transfer sheet can be used in the present invention, and no particular limitation is imposed thereon. Preferable examples of the dye include MS Red G, Macrolex Red Violet R, Ceres Red 7B, Samaron Red HBSL and Resolin Red F3BS as red dyes; Foron Brilliant Yellow 6GL, PTY-52 and Macrolex Yellow 6G as yellow dyes; and Kayaset Blue 714, Waxoline Blue AP-FW, Foron Brilliant Blue S-R and MS Blue-100 as blue dyes.

Preferable examples of a binder resin used as a carrier of the above dye include cellulose resins such as ethyl cellulose, hydroxyethyl cellulose, ethylhydroxy cellulose, hydroxypropyl cellulose, methyl cellulose, cellulose acetate and cellulose butyrate, vinyl resins such as polyvinyl alcohol, polyvinyl acetate, polyvinyl butyral, polyvinyl acetal and polyvinyl pyrrolidone, acrylic resins such as poly(meth)acrylate and poly(meth)acrylamide, polyurethane resins, polyamide resins and polyester resins. Of these resins, cellulose resins, vinyl resins, acrylic resins, polyurethane resins and polyester resins are preferred from the viewpoints of heat resistance and migration of the dye.

The above-described dye and binder resin, and, if necessary, some additives such as a releasing agent are dissolved in a proper organic solvent or dispersed in an organic solvent or water. The resulting solution or dispersion is coated onto one surface of the substrate sheet by an application means such as a gravure printing method, a screen printing method or a reverse roll coating method using a gravure, and then dried, whereby a desired dye layer can be formed on the substrate sheet.

The thickness of the dye layer is approximately from 0.2 to 5.0 μm, preferably from 0.4 to 2.0 μm. The amount of the sublimable dye contained in the dye layer is from 5% to 90% by weight, preferably from 10% to 70% by weight of the total weight of the dye layer.

In order to obtain a monochromic image, a dye layer is formed using one of the previously-mentioned dyes. To obtain a full-colored image, dye layers of cyan, magenta, yellow and if necessary black colors are formed by respectively using a cyan dye, a magenta dye, a yellow dye and if necessary a black dye, properly selected from the previously-mentioned dyes.

The resistor layer is formed on the other surface of the substrate sheet. A thermoplastic resin is used for preparing the resistor layer. Examples of the resin include polyester resins, polyacrylic ester resins, polyvinyl acetate resins, styrene acrylate resins, polyurethane resins, polyolefin resins, polystyrene resins, polyvinyl chloride resins, polyether resins, polyamide resins, polycarbonate resins, polyethylene resins, polypropylene resins, polyacrylate resins, polyacrylamide resins, polyvinyl chloride resins, polyvinyl acetal resins such as polyvinyl butyral, acrylsilicone resins, fluororesins and phenoxy resins.

In order to impart heat resistance, film-forming ability and adhesion to the substrate to the resistor layer, the resistor layer is crosslinked by application of both heat and an ionizing radiation. Namely, the crosslinking agent for use in the present invention is characterized by comprising a mixture of a thermosetting crosslinking agent and an ionizing-radiation-curable crosslinking agent.

It is preferable to use as the crosslinking agents polyisocyanate and an ionizing-radiation-curable reactive monomer in combination. Preferred embodiments of the invention in which the above combination is adopted will now be explained.

The combination use of a resin having a reactive group such as an OH group and the crosslinking agent is preferred in order to harden the resin by application of heat. Typical examples of the combination of the reactive resin and the crosslinking agent are polyvinyl butyral and polyisocyanate, acryl polyol and isocyanate, cellulose acetate and polyisocyanate, polyester and polyisocyanate, a fluororesin and polyisocyanate, and a phenoxy resin and polyisocyanate. Any known polyisocyanate which is used for conventional paints, adhesives and synthesis of polyurethane can be used as the polyisocyanate in the above combinations.

A reactive monomer (multifunctional monomer) is incorporated into the resin used for forming the resistor layer so that the layer can be crosslinked by irradiation of an ionizing radiation. Examples of the multifunctional monomer include tetraethylene glycol dimethacrylate, divinylbenzene, diallyl phthalate, triallyl isocyanurate, trimethylolpropane trimethacrylate, trimethylolpropane triacrylate, tetramethylolmethane tetramethacrylate, trimethoxyethoxyvinylsilane. In addition, oligomers or macromers composed of the above monomers can also be employed in the present invention.

In the above embodiment, the amount of the polyisocyanate is from 1 to 20 parts by weight, preferably from 1 to 5 parts by weight, for 100 parts by weight of the binder resin contained in the resistor layer; and the amount of the reactive monomer is from 5 to 30 parts by weight, preferably from 5 to 15 parts by weight, for 100 parts by weight of the binder resin.

In the case where the amount of the polyisocyanate is less than the above range, a sufficiently high crosslink density cannot be obtained. As a result, the resistor layer obtained cannot have sufficiently high resistance to heat, and the adhesion between the resistor layer and the substrate sheet is also unsatisfactory. On the other hand, when the amount of the polyisocyanate is in excess of the above range, the resistor layer cannot be prevented from shrinking, a long time is required for hardening, and an unreacted NCO group remains in the resistor layer and reacts with water in the air. When the amount of the reactive monomer is less than the above range, a sufficiently high crosslink density cannot be obtained, while when it is more than the above range, the adhesion between the resistor layer and the substrate sheet is reduced. Moreover, when an unreacted monomer is remaining in the resistor layer, it acts as a plasticizer, resulting in deterioration of the heat resistance of the resistor layer.

Besides the polyisocyanate, an organometal compound or a silane compound such as a silane coupling agent can also be used as the thermosetting crosslinking agent. A titanium compound, an aluminum compound, a zirconium compound or the like is preferably employed as the organometal compound; and N-2-(aminoethyl)-3-aminopropylmethoxy silane, N-2-(aminoethyl)-3-aminopropylmethyldimethoxy silane or the like is preferably used as the silane compound.

In addition to the above-described reactive monomers, an oligomer or a macromer composed of the reactive monomers can also be used as the ionizing-radiation-curable crosslinking agent. Specifically, phthalic acid monohydroxyethylacrylate or 2-hydroxy-3-phenoxypropylacrylate is preferably used.

In the above embodiment, the amount of the thermosetting crosslinking agent is from 1 to 20 parts by weight, preferably from 1 to 5 parts by weight, per 100 parts by weight of the binder resin contained in the resistor layer; and the amount of the ionizing-radiation-curable crosslinking agent is from 5 to 30 parts by weight, preferably from 5 to 15 parts by weight, per 100 parts by weight of the binder resin.

The above resistor layer is formed in the following manner:

A solvent, an electrically conductive filler, and if necessary additives such as a dispersing agent are added to a resin, and the mixture is made into an ink-like composition by a dispersion mixer or a kneader such as a sand mill, a ball mill, a three-roll mill, or a laboplastomill. To this composition, a multifunctional monomer and a crosslinking agent are added to obtain an ink for forming a resistor layer. The ink is coated onto a substrate sheet by means of a solvent coating method, a hot melt method or an extrusion coating method (EC), dried, and crosslinked by irradiation of an ionizing radiation to form a resistor layer. It is possible to harden the thermosetting crosslinking agent by utilizing heat which is generated when the ionizing-radiation-curable crosslinking agent is hardened. If the resistor layer cannot be fully hardened by a single treatment, it is necessary to subject the resistor layer to another treatment for hardening. Moreover, it is possible to crosslink the resistor layer by irradiation of an ionizing radiation after the layer is hardened by application of heat. Any method other than the above-described method is adoptable for forming the resistor layer, and no particular limitation is imposed thereon.

A metal powder or a metal oxide is employable as the electrically conductive filler to be incorporated into the resistor layer. However, a preferred electrically conductive filler is carbon black such as furnace black, acetylene black, kettchen black, channel black or thermal black. The incorporation amount of carbon black is the same as that in a resistor layer of a conventional thermal transfer sheet. For instance, 100 parts by weight or less, preferably from 20 to 60 parts by weight of carbon black is used for 100 parts by weight of the resin contained in the resistor layer.

In addition to the above, even such a particle that is inherently an insulator or has a low electric conductivity can be used as the electrically conductive filler if it is metallized. For instance, inorganic particles such as alumina, silica, titania, calcium carbonate, aluminum hydroxide, magnesium oxide, magnesium carbonate, potassium titanate, carbon black, graphite, glass, titanium black, silicon nitride and boron nitride, and plastic pigments such as a polystyrene resin particle, an acrylic resin particle, a phenol resin particle, a benzoguanamine resin particle and a hardened particle of the above resin can be used if they are imparted with electric conductivity by a metallizing treatment.

It is preferable to use an ultraviolet ray (UV) or an electron beam (EB) as an ionizing radiation to crosslink the resistor layer. An ultraviolet ray generated by a conventional ultraviolet ray generator of various types can be employed in the present invention. In the case where the ultraviolet ray is used as an ionizing radiation, it is preferable to incorporate a photosensitizing agent, a polymerization initiator or a radical generator into the resistor layer in advance. An electron beam generated by any conventional electron beam generator can also be used as an ionizing radiation. When the electron beam is used, it is not always necessary to incorporate a photosensitizer, a polymerization initiator or a radical generator into the resistor layer.

The thickness of the resistor layer is, in general, in the range of approximately 1 to 10 μm. A lubricant may be incorporated into the resistor layer to improve the lubricity of the resistor layer. It is preferable to adjust the surface resistance value of the resistor layer to 500 Ω/□ to 5 KΩ/□.

Any image-receiving sheet can be used along with the electrothermal transfer sheet of the present invention as long as a recording surface thereof is receptive to the previously-mentioned dyes. Even those materials which are not receptive to the dyes, such as paper, a metal, glass and a synthetic resin, can be used if they are provided with a dye-receiving layer on at least one surface thereof.

To conduct electrothermal transfer recording using the electrothermal transfer sheet of the present invention and the above-described image-receiving sheet, any known printer of an electrothermal type can be used as it is.

The present invention will now be explained more specifically with reference to Examples and Comparative Examples. However, the following Examples should not be construed as limiting the present invention. Throughout the examples, quantities expressed in "parts" or "percent (%)" are on the weight basis, unless otherwise indicated.

In the examples, an electron beam of 175 keV and 5 Mrad, generated by a low-energy EB irradiator of an electron curtain type (available from ESI Corp.) was used to crosslink a resistor layer. Hardening of a resistor layer by application of heat was conducted at a temperature of 130° C. for 15 minutes.

EXAMPLE 1

Formulation of Composition for Forming Resistor Layer

| | |
|---|---|
| Polyurethane resin ("Pandex T-5000" (Trademark) manufactured by Dainippon Ink & Chemicals, Inc.) | 10 parts |
| Carbon black ("HS-500" (Trademark) manufactured by Asahi Carbon Co., Ltd.) | 6 parts |
| Polyisocyanate ("Coronate 2030" (Trademark) manufactured by Nippon Polyurethane Industry Co., Ltd.) | 0.1 parts |
| Acrylate Monomer ("ARONIX M-400" (Trademark) manufactured by Toa Gosei Chemical Industry Co., Ltd.) | 1 part |
| Toluene/Methyl ethyl ketone (weight ratio = 1:1) | 100 parts |

The above resin and carbon black were dispersed in the solvent by a paint shaker. To the resulting dispersion were added the polyisocyanate and the acrylate monomer, thereby obtaining an ink-like composition. The composition was coated onto one surface of a PET substrate sheet (thickness: 6 μm) in a thickness of 5 μm when dried by a wire bar, irradiated with an electron beam, and then hardened by application of heat to form a resistor layer on the substrate sheet.

Thereafter, an ink for forming a dye layer having the following formulation was coated onto the other surface of the substrate sheet in an amount of 1.0 $g/m^2$ on dry basis by means of gravure printing, and dried. An electrothermal transfer sheet according to the present invention was thus obtained.

Formulation of Ink for Forming Dye Layer:

| | |
|---|---|
| C.I. Solvent Blue 22 | 5.50 parts |
| Acetoacetal resin | 3.00 parts |
| Methyl ethyl ketone | 22.54 parts |
| Toluene | 68.18 parts |

EXAMPLE 2

The following components were dispersed by a sand mill to obtain an ink-like composition. By using the composition, an electrothermal transfer sheet according to the present invention was prepared in the same manner as in Example 1.

Formulation of Composition for Forming Resistor Layer

| | |
|---|---|
| Polyvinyl butyral resin ("S-Lec BX-1" (Trademark) manufactured by Sekisui Chemical Co., Ltd.) | 10 parts |
| Carbon black ("HS-500" (Trademark) manufactured by Asahi Carbon Co., Ltd.) | 4 parts |
| Electrically conductive whisker ("Dentall BK-300" (Trademark) manufactured by Otsuka Chemical Co., Ltd.) | 2 parts |
| Polyisocyanate ("Sumidur HT" (Trademark) manufactured by Sumitomo Bayer Urethane Co., Ltd.) | 0.2 parts |
| Acrylate Monomer ("ARONIX M-309" (Trademark) manufactured by Toa Gosei Chemical Industry Co., Ltd.) | 2 parts |
| Toluene/Methyl ethyl ketone (weight ratio = 1:1) | 100 parts |

EXAMPLE 3

The following components were dispersed by a sand mill to obtain an ink-like composition. By using the composition, an electrothermal transfer sheet according to the present invention was prepared in the same manner as in Example 1.

Formulation of Composition for Forming Resistor Layer

| | |
|---|---|
| Polyester resin ("Vylon 200" (Trademark) manufactured by Toyobo Co., Ltd.) | 10 parts |
| Carbon black ("#3250" (Trademark) manufactured by Mitsubishi Chemical Industries, Ltd.) | 5 parts |
| Polyisocyanate ("Coronate EH" (Trademark) manufactured by Nippon Polyurethane Industry Co., Ltd.) | 0.1 parts |
| Acrylate Monomer ("ARONIX M-400" (Trademark) manufactured by Toa Gosei Chemical Industry Co., Ltd.) | 1.5 parts |
| Toluene/Methyl ethyl ketone (weight ratio = 1:1) | 100 parts |

EXAMPLE 4

The following components were dispersed by a paint shaker to obtain an ink-like composition. By using the composition, an electrothermal transfer sheet according to the present invention was prepared in the same manner as in Example 1.

Formulation of Composition for Forming Resistor Layer

| | |
|---|---|
| Polyester resin ("Vylon 200" (Trademark) manufactured by Toyobo Co., Ltd.) | 10 parts |
| Carbon black ("HS-500" (Trademark) manufactured by Asahi Carbon Co., Ltd.) | 6 parts |
| Polyisocyanate ("Sumidur HT" (Trademark) manufactured by Sumitomo Bayer Urethane Co., Ltd.) | 0.4 parts |
| Acrylate Monomer ("ARONIX M-309" (Trademark) manufactured by Toa Gosei Chemical Industry Co., Ltd.) | 4 parts |
| Toluene/Methyl ethyl ketone (weight ratio = 1:1) | 100 parts |

COMPARATIVE EXAMPLE 1

The following components were dispersed by a sand mill to obtain an ink-like composition. By using the composition, a comparative electrothermal transfer sheet was prepared in the same manner as in Example 1.

Formulation of Composition for Forming Resistor Layer

| | |
|---|---|
| Polyurethane resin ("Pandex T-5000" (Trademark) manufactured by Dainippon Ink & Chemicals, Inc.) | 10 parts |
| Carbon black ("#3250" (Trademark) manufactured by Mitsubishi Chemical Industries, Ltd.) | 5 parts |
| Polyisocyanate ("Coronate 2030" (Trademark) manufactured by Nippon Polyurethane Industry Co., Ltd.) | 0.3 parts |
| Toluene/Methyl ethyl ketone (weight ratio = 1:1) | 100 parts |

COMPARATIVE EXAMPLE 2

The following components were dispersed by a sand mill to obtain an ink-like composition. By using the composition, a comparative electrothermal transfer sheet was prepared in the same manner as in Example 1.

Formulation of Composition for Forming Resistor Layer

| | |
|---|---|
| Polyvinyl butyral resin ("S-Lec BX-1" (Trademark) manufactured by Sekisui Chemical Co., Ltd.) | 10 parts |
| Carbon black ("HS-500" (Trademark) manufactured by Asahi Carbon Co., Ltd.) | 4 parts |
| Electrically conductive whisker ("Dentall BK-300" (Trademark) manufactured by Otsuka Chemical Co., Ltd.) | 2 parts |
| Acrylate Monomer ("ARONIX M-400" (Trademark) | 3 parts |

-continued

| | |
|---|---|
| manufactured by Toa Gosei Chemical Industry Co., Ltd.) | |
| Toluene/Methyl ethyl ketone (weight ratio = 1:1) | 100 parts |

The above-obtained electrothermal transfer sheets according to the present invention and comparative ones were evaluated in the following various manners:

Each electrothermal transfer sheet was superposed on a conventional thermal transfer image-receiving sheet, and transfer recording of an image was conducted using an electrothermal transfer recording apparatus under the following conditions. The adhesion between the substrate sheet and the resistor layer, scrapings of the resistor layer deposited to the electrode head, the quality of the recorded image, heat resistance of the resistor layer, and shrinkage of the resistor layer (curl) were observed. The results are shown in Table 1.

Conditions for Transfer Recording of Image

Pulse width: 1 ms
Recording frequency: 2.0 ms/line
Recording energy: 3.0 J/cm$^2$

Adhesion between Resistor Layer and Substrate Sheet

An adhesive tape, "Mending Tape 810" (Trademark) manufactured by Sumitomo 3M Limited, was adhered to the surface of the resistor layer of each electrothermal transfer sheet with a pressure of 1 kg/m$^2$. The adhesive tape was then peeled off the electrothermal transfer sheet in the direction of 180° with the transfer sheet fixed. The adhesive strength between the resistor layer and the substrate sheet was evaluated.

Film Properties Evaluated by Scrapings Deposited to Electrode Head

After an image was recorded using the above electrothermal transfer recording apparatus, the electrode head was observed by a microscope whether or not it was deposited with scrapings of the resistor layer.

Quality of Recorded Image

After an image was recorded using the above electrothermal transfer recording apparatus, the image was visually observed.

Heat Resistance

Two electrothermal transfer sheets (the same ones) were superposed with their resistor layers faced, and pressed while heat was applied thereto by a heat sealer manufactured by Toyo Seiki Seisaku-sho, Ltd. under the following conditions. Adhesion between the transfer sheets caused by heat fusion was observed.

Temperature: 250° C.
Pressure: 2 kg/cm$^2$
Pressing Time: 5 sec

Shrinkage of Resistor Layer (Curl)

After a resistor layer was formed on a substrate sheet, hardened by application of heat, and then crosslinked by irradiation of an ionizing radiation, curl of the finally-obtained electrothermal transfer sheet was visually observed.

Total Evaluation

Each electrothermal transfer sheet was evaluated totally, and rated against the following standard:

⊚: Film properties were very good. Neither curl nor adhesion caused by heat fusion was observed, and a high quality image was obtained.

Δ: Film properties were almost good. However, heat resistance was lacking, so that adhesion caused by heat fusion was partly observed. The electrode head was found to be deposited with scrapings of the resistor layer. The image-recorded surface was wrinkled.

x: The resistor layer shrinked and it was lacking in heat resistance, so that the electrode head was deposited with scrapings of the resistor layer produced by friction, and the transfer sheet was broken.

TABLE 1

| | Adhesion | Scrapings | Quality of Image | Heat Resistance | Shrinkage of Resistor Layer | Total Evaluation |
|---|---|---|---|---|---|---|
| Example 1 | ○ | ○ | ○ | ○ | ○ | ⊚ |
| Example 2 | ○ | ○ | ○ | ○ | ○ | ⊚ |
| Example 3 | ○ | ○ | ○ | ○ | ○ | ⊚ |
| Example 4 | Δ | Δ | Δ | Δ | Δ | Δ |
| Comparative Example 1 | ○ | Δ | Δ | Δ | X | X |
| Comparative Example 2 | X | Δ | Δ | Δ | ○ | X |

In the above table, the common evaluation standard for the items other than "Total Evaluation" is as follows:

○: Good
Δ: Slightly inferior, but suitable for practical use
x: Poor, unsuitable for practical use As described above, both a thermosetting crosslinking agent and an ionizing-radiation-curable crosslinking agent are employed to crosslink a resistor layer in the present invention. Therefore, an electrothermal transfer sheet whose resistor layer shrinks less when heat is applied thereto and is superior in adhesion to a substrate sheet, heat resistance and the resistance value than a resistor layer crosslinked with the thermosetting crosslinking agent or the ionizing-radiation-curable crosslinking agent, can be obtained with high productivity.

We claim:

1. An electrothermal transfer sheet comprising:

a substrate sheet having a thickness of about 0.5–50 μm;

a heat-transferable dye layer formed on one surface of the substrate sheet, said heat-transferable dye layer having a thickness of about 0.2–5.0 μm; and a resistor layer capable of generating heat when an electric current is applied thereto from an electrode head, formed on the other surface of the substrate sheet, said resistor layer having a thickness of about 1–10 μm and comprising (a) a binder resin, (b) an electrically conductive filler, and (c) a crosslinking agent which comprises a mixture of (i) a thermosetting crosslinking agent and (ii) an ionizing-radiation-curable crosslinking agent comprising an ionizing-radiation-curable reactive monomer present in an amount of 5 to 30 parts by weight per 100 parts by weight of the binder resin.

2. An electrothermal transfer sheet as set forth in claim 1, wherein the thermosetting crosslinking agent comprises polyisocyanate in an amount from 1 to 20 parts by weight per 100 parts by weight of the binder resin.

3. An electrothermal transfer sheet as set forth in claim 1, wherein the crosslinking agent (c) comprises a thermosetting crosslinking agent selected from the group consisting of organometal compounds and silane compounds, and an ionizing-radiation-curable cross-linking agent selected from the group consisting of oligomers and macromers composed of reactive monomers.

4. A sublimation transfer sheet comprising the electrothermal transfer sheet as set forth in claim 1.

5. A heat-fusion transfer sheet comprising the electrothermal transfer sheet as set forth in claim 1.

* * * * *